United States Patent
Kreuzer et al.

(10) Patent No.: US 6,752,039 B2
(45) Date of Patent: Jun. 22, 2004

(54) SHOCK-ABSORBED VEHICLE STEERING WHEEL

(75) Inventors: Martin Kreuzer, Kleinwallstadt (DE); Udo Bieber, Niedernberg (DE); Christian Lorenz, Leidersbach (DE)

(73) Assignee: TRW Automotive Safety Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/090,263

(22) Filed: Mar. 4, 2002

(65) Prior Publication Data

US 2002/0124683 A1 Sep. 12, 2002

(30) Foreign Application Priority Data

Mar. 8, 2001 (DE) .......................... 201 04 043
Dec. 18, 2001 (DE) .......................... 201 20 465

(51) Int. Cl.⁷ .............................................. B62D 1/04
(52) U.S. Cl. ........................................................ 74/552
(58) Field of Search ............................................ 74/552

(56) References Cited

U.S. PATENT DOCUMENTS 4,712,446 A * 12/1987 Kamata et al. ............... 74/492
5,489,009 A * 2/1996 Kawamata et al. ......... 188/267.1
6,147,416 A * 11/2000 Mitsuzuka .................. 307/10.1
6,279,952 B1 * 8/2001 Van Wynsberghe et al. ............................ 280/777
6,352,651 B1 * 3/2002 Endo et al. .................... 252/74

FOREIGN PATENT DOCUMENTS

| DE | 19852315 A1 | 5/2000 | |
| DE | 20016637 | 2/2001 | |
| EP | 0003426 | 8/1979 | |
| EP | 0827878 A2 | 3/1998 | |
| JP | 1-229763 | * 9/1989 | ............ B62D/1/04 |
| JP | 05238394 | 9/1993 | |
| JP | 2000-16300 | * 1/2000 | ............ B62D/1/04 |

* cited by examiner

Primary Examiner—Thomas R. Hannon
Assistant Examiner—Vicky A. Johnson
(74) Attorney, Agent, or Firm—Tarolli, Sundheim, Covell & Tummino L.L.P.

(57) ABSTRACT

The invention relates to a shock-absorbed vehicle steering wheel which comprises a hub with a steering wheel mounting and a handling region for a driver. The handling region is, in particular, a steering wheel rim. A vibration damper is provided in a path of the flux of force between the steering wheel mounting and the handling region. The vibration damper has damping characteristics which are adjustable via one of an electrical and magnetic field.

15 Claims, 2 Drawing Sheets

SHOCK-ABSORBED VEHICLE STEERING WHEEL

TECHNICAL FIELD

The invention relates to a shock-absorbed vehicle steering wheel.

BACKGROUND OF THE INVENTION

Steering wheels are normally composed of a hub with a steering wheel mounting and of a handling region for the driver, in particular a steering wheel rim. To increase the comfort and the driving safety, it is advantageous if vehicle vibrations, which arise through various causes and which are transferred to the steering wheel, in particular to the steering wheel rim, can be damped or entirely suppressed. For this purpose, for example so-called vibration neutralizers are used. A known vibration neutralizer contains a mass, mounted elastically in the steering wheel, which is set into vibration at the inherent frequency of the vibration neutralizer and thus takes up the vibration energy of the steering wheel. With these systems, it is disadvantageous on the one hand that they can be adapted only to individual frequencies and on the other hand that they take up a large amount of space inside the steering wheel or the hub.

BRIEF SUMMARY OF THE INVENTION

It is an object of the invention to provide a shock-absorbed steering wheel including a damping means that is tunable in a defined frequency range and requires a relatively small amount of space for the shock-absorbing components.

This is achieved in a steering wheel which comprises a hub with a steering wheel mounting and a handling region for a driver. The handling region is, in particular, a steering wheel rim. A vibration damper is provided in a path of the flux of force between the steering wheel mounting and the handling region. The vibration damper has damping characteristics which are adjustable via one of an electrical and magnetic field. The vibration damper is arranged, as it were, between the hub and the steering wheel rim, so that the steering wheel mounting and the steering wheel rim can be neutralized with regard to vibration. By means of the strength of the electrical or magnetic field, for example via an applied voltage or an electric current, the damping characteristics, i.e. the vibration frequencies which are able to be damped, can be adjusted in a simple manner. An additional neutralizer mass can be dispensed with.

Preferably, the vibration damper has a substance intercalated into the flux of force, the hardness and/or viscosity of such substance being variably adjustable by the electrical or magnetic field. Hardness and viscosity have influence on the mechanical vibration characteristics of the substance and, hence, the vibration frequencies which are able to be damped.

The substance is preferably an electrorheological fluid. A commercially available electrorheological fluid can be used, which is distinguished in that its viscosity can be altered in a wide range by the influence of an electrical field. With high field intensities, these fluids behave, up to certain limiting conditions, like a „soft" solid body designated here as „semi-solid body mode", which permits a transfer of force via the electrorheological fluid, but at the same time is able to be altered through the strength of the field intensity in its hardness and hence in its vibration characteristics.

It is also conceivable to use as a substance a magnetorheological fluid, the viscosity of which is able to be influenced by a magnetic field. Of course, owing to the limited amount of space available, the use of an electrorheological fluid presents itself, because electrodes for the generation of an electrical field, such as for example wires or metal plates, can be arranged more simply in the steering wheel than coils for the generation of a magnetic field.

In order to achieve a frequency-dependent vibration damping, preferably a control unit is provided, which can determine the intensity of the electrical or magnetic field generated by the electrodes, by adjusting the voltage applied thereto and the flow of current, respectively. The control unit is preferably connected with sensors which can detect vibrations of the steering wheel, in particular of the steering column, the control unit being able to adjust the field intensity as a function of the frequency of the detected vibrations, in order to thus reduce the vibration amplitude of the steering wheel. In particular, the control unit can preferably vary the field intensity such that no vibrations are stimulated in the handling region.

In a preferred embodiment of the invention, the hub or the handling region has at least one projection which projects into a depression formed on the respective other part, the substance being provided between the projection and the depression. The projection on the handling region can be provided for example in the region of a spoke. The hub and the steering wheel mounting, respectively, and the handling region are coupled with each other by the substance. The substance is preferably operated in „semi-solid body mode", because thus on actuation of the steering wheel a compression stress can be transferred through the substance, in order to carry out a steering movement. Nevertheless, the hardness and hence the damping characteristics can still be adapted via the strength of the field intensity. This system can also be provided in the region of the hub, where there is more space to accommodate the vibration damper, the hub being divided into several parts and the substance connecting the hub parts with each other.

The hub and the handling region or the hub parts are preferably only separated from each other by a narrow intermediate space (0.1 to 5 mm wide), which is filled with the electrorheological or magnetorheological fluid. As the hub and the handling region do not touch each other directly at any point, vehicle vibrations transferred for example via the steering shaft to the steering wheel mounting are not transferred by means of direct contact of the hub to the handling region or of the hub parts, but rather can only arrive at the steering wheel rim via the electrorheological or magnetorheological fluid. However, the hardness or viscosity of the substance can be adapted so quickly and flexibly to the respective vibration frequencies via the strength of the field intensity, that vibrations of the handling region can be effectively damped.

In another preferred embodiment of the invention, the vibration damper comprises a space which is filled with the substance and forms a closed ring. Here, too, this space is constructed such that it separates the hub and the handling region from each other, and such that the hub and the handling region are coupled with each other via this space.

It is advantageous if the space has a shape which deviates from a circular ring, for example has the form of a polygon. In this way, the geometry of the ring-shaped space can be utilized in order to make possible the transfer of force via the substance. The substance forms a „semi-solid body" in the form of a polygonal ring, which is prevented by its shape from rotating in the ring-shaped space, if a rotational force is exerted onto it. Instead of this, the rotational force originating from the steering wheel mounting (and the hub, respectively) or the handling region is transferred without play onto the other respective steering wheel section. The corners of the polygon act as projections which project into depressions of the other part, in order to achieve on actuation of the steering wheel a compressive stress through the substance provided between the projections and the depressions.

In order to increase the transfer of force between the parts which are coupled by the substance, the walls delimiting the space preferably have a structure which is designed such that it supports adhesion of the substance to the walls. Hereby, the steering becomes more direct, because a slippage between the substance and the wall is largely eliminated, when the substance is operated in the „semi-solid body mode".

In order to ensure a reliable steering actuation even in an extreme operation, for example in the case of an extremely vigorous and rapid steering movement or in the case of failure of the electrical or magnetic field, the vibration damper is advantageously designed such that in extreme operation a continuous form-fitting connection is made possible between the handling region and the steering wheel mounting. In this case, the vibration damper can be bypassed, so that a direct coupling exists between the parts adjoining the substance.

DETAILED DESCRIPTION OF THE PREFERRED EMBODIMENTS

Figure 1:
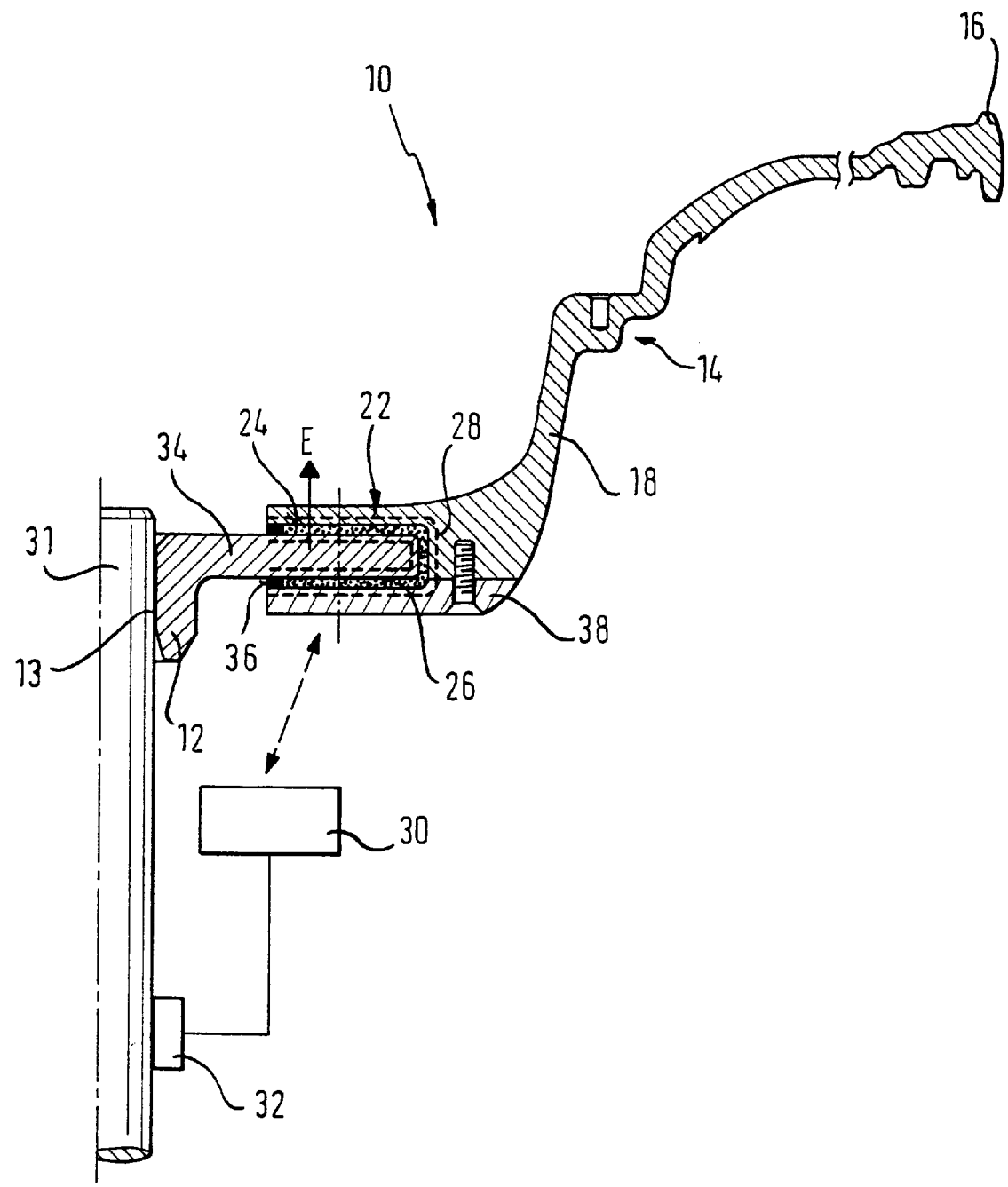
FIG. 1 shows a sectional view of a section of a skeleton of a steering wheel according to the invention in accordance with a first embodiment.

FIG. 1 shows a first embodiment of a shock-absorbed steering wheel 10. The steering wheel 10 has a hub 12, of which only the skeleton is illustrated. In the hub 12 a steering wheel mounting 13 is provided, in which for example in a known manner the end of a steering shaft is held, which is not shown here. The steering wheel 10 contains in addition a handling region 14 for the driver, which quite generally includes a steering wheel rim 16 and spokes 18, only the skeleton of which is likewise illustrated in FIG. 1.

In the flux of force between the hub 12 and the handling region 14 (the spokes in this arrangement), a vibration damper 22 is provided. The hub 12 and the handling region 14 are separated from each other in the region of the vibration damper 22 by an intermediate space 24.

In the embodiment illustrated, the hub 12 has a projection 34, whereas the handling region 14 has a depression 36 in the region of the spoke 18. The depression 36 can be realized for example by a recess in the handling region 14 and also by a screwed-on cover 38. The intermediate space 24 is formed between the projection 34 and the depression 36 and is designed such that no direct form fit exists between the hub 12 and the handling region 14.

In the intermediate space 24, there is provided a substance 26, the viscosity and/or hardness of which is able to be influenced by an electrical or magnetic field. In the example shown here, this is an electrorheological fluid.

The electrical field E (indicated in the Figures by an arrow) to control the electrorheological fluid is generated by electrodes 28, which are arranged in the hub 12 and in the handling region 14 in direct vicinity of the intermediate space 24 (illustrated diagrammatically by dashed lines). As electrodes, for example sheet metal plates can be used. The most favorable arrangement of the electrodes in each case depends on the conditions of use and on the exact geometry of the steering wheel concerned and is easy for a specialist in the art to determine. The electrodes should be designed for the application of a high voltage of a several kilovolt with small current intensities of a few milliamps and be electrically insulated accordingly with respect to the other parts of the steering wheel 10.

The voltage of the electrodes 28 and hence the field intensity E generated therefrom is generated by a control unit 30, which is connected with a vibration sensor 32 arranged on the steering wheel mounting or on the steering column 31.

In order to prevent a direct contact between the hub 12 and the handling region 14 and in order to make possible a direct actuation of the steering, the field intensity generated by the electrodes 28 is preferably selected to be so high that the substance 26 is always in the „semi-solid body mode".

Vibrations transferred via the steering shaft onto the hub 12, which are passed on via the substance 26 to the handling region 14 and hence to the steering wheel rim 16, are detected by the vibration sensor 32 and the information is given to the control unit 30. The latter then adjusts the electrical field intensity E via the voltage applied to the electrodes 28 such that the vibration frequency transferred at that time to the steering wheel rim 16 is damped by the vibration damper 22. This is possible, because the viscosity or the hardness of the substance 26 is specifically adjustable through the field intensity, and the vibration characteristics of the substance 26 can be influenced by means of the hardness and viscosity, respectively.

Figure 2:
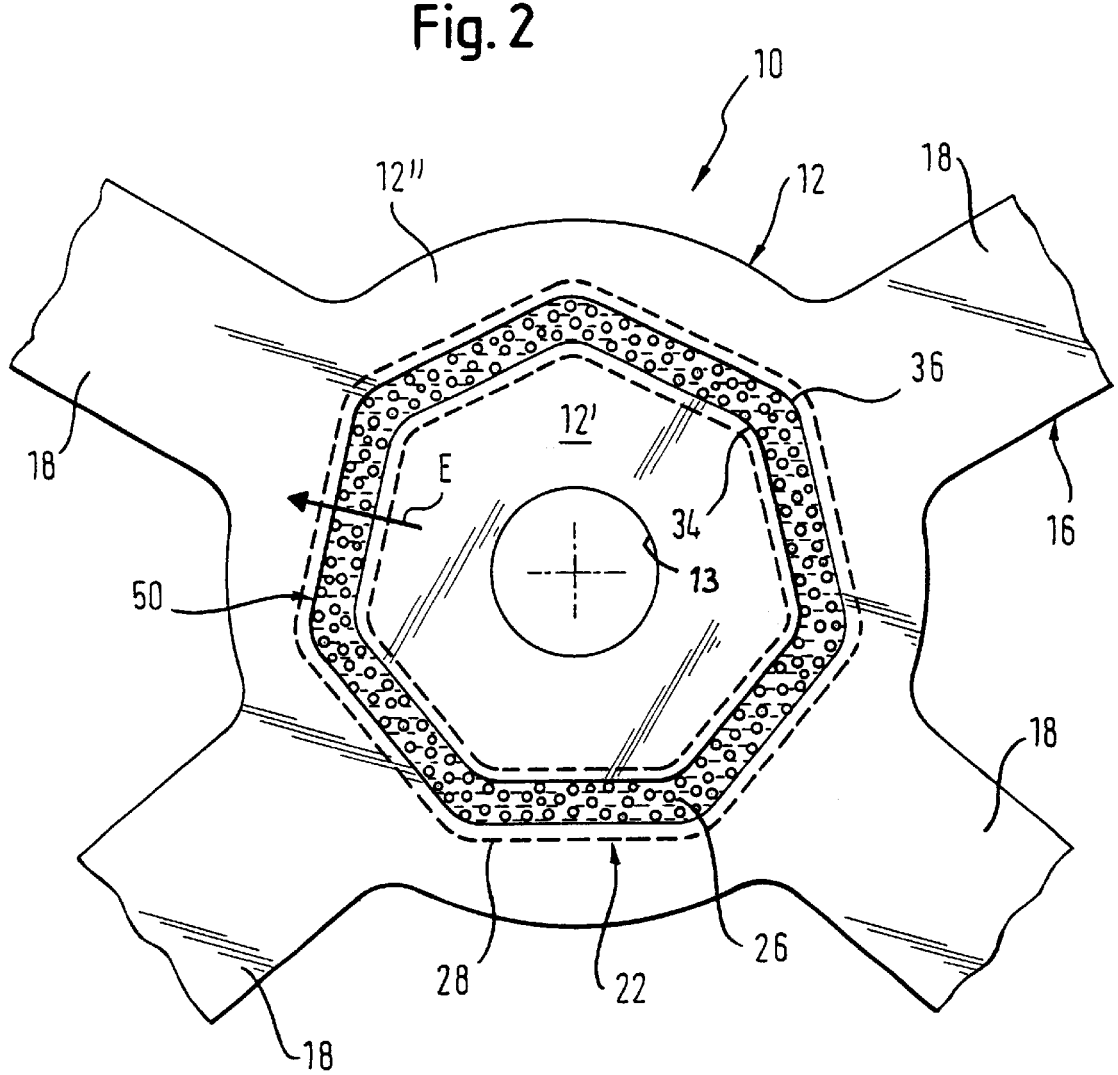
FIG. 2 shows a diagrammatic top view of a section of a steering wheel according to the invention in accordance with a second embodiment.

The second embodiment illustrated in FIG. 2 differs from the first embodiment in that the hub 12 is divided in two parts, namely an inner hub part 12' and an outer hub part 12", the two hub parts 12', 12" being separated from each other by a ring-shaped space 50 which is filled with an electrorheological substance 26. The second hub part 12" forms a section of the handling region 14. The ring-shaped space 50 can be constructed in cross-section like the intermediate space 24 shown in FIG. 1. Also, the arrangement of the electrodes 28 can be selected in an analogous manner.

The ring-shaped space 50 has the form of a polygon which in the example illustrated here has seven corners. The projections 34 of the inner hub part 12' engage into the depressions 36 of the outer hub part 12". Preferably, the electrorheological fluid is also operated in „semi-solid body mode" in this case.

The dimensions and geometry of the hub parts 12', 12" and also of the ring-shaped space 50 are coordinated with each other such that the inner hub part 12' can only rotate about a small angle range, before it would come into contact with the wall of the outer part 12", when no electrical field E is applied to the substance 26. This arrangement makes it possible to produce, in extreme operation, a continuous form-fitting connection between the handling region 14 and the hub region 12. This may be necessary for example if in an emergency situation an extreme steering action is necessary, with very high forces, or when the electrical field generated by the electrodes 28 fails. In this case, through the steering movement of the user, the outer hub part 12″ is turned so far with respect to the inner hub part 12′ until the walls thereof contact each other. Now a steering force can be transferred directly onto the steering wheel mounting 13.

Figure 3:
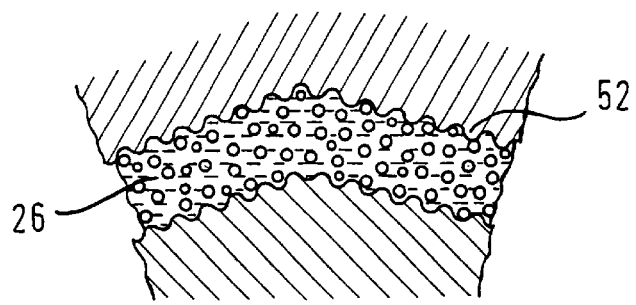
FIG. 3 shows a diagrammatic illustration of the wall structure of the space from FIG. 2, filled with substance.

Preferably, the walls of the spaces 24, 50 filled with the substance 26 have a structure 52 such as for instance a coarseness or a corrugation, which is selected in a known manner such that the substance 26 especially in the „semi-solid body mode" has a good adhesion to the walls. This is shown, very diagrammatically, in FIG. 3.

What is claimed is:

1. A shock-absorbed vehicle steering wheel comprising: a hub with a steering wheel mounting and a steering wheel rim, a vibration damper being provided in a path of the flux of force between said steering wheel mounting and rim, said vibration damper having damping characteristics which are adjustable via one of an electrical and magnetic field, wherein said vibration damper has a substance intercalated into said flux of force, at least one of a hardness and viscosity of said substance being variably adjustable by one of said electrical and magnetic field.

2. The steering wheel according to claim 1 wherein said substance is an electrorheological fluid.

3. The steering wheel according to claim 1 wherein said substance is a magnetorheological fluid.

4. The steering wheel according to claim 1 wherein said vibration damper comprises a space which is filled with said substance and forms a closed ring.

5. The steering wheel according to claim 4 wherein said space has a shape deviating from a circular ring.

6. The steering wheel according to claim 4 wherein said space has a polygonal shape.

7. The steering wheel according to claim 1 wherein one of said handling region has at least one projection which projects into a depression formed on the respective other of said hub and handling region, said substance being provided between said projection and said depression, and said hub and said handling region being coupled with each other by said substance, so that on actuation of said steering wheel a compressive load can be transferred through said substance.

8. The steering wheel according to claim 1 wherein said hub is divided into several hub parts comprising an inner hub part and an outer hub part, said inner and outer parts being coupled with each other by said substance, one of said hub parts having projections which project into depressions of the respective other hub part, so that on actuation of said steering wheel a compressive load can be transferred through said substance provided between said projections and said depressions.

9. the steering wheel according to claim 1, wherein said vibration damper, in an extreme operation, permits a continuous form-fitting connection between said handling region and said steering wheel mounting.

10. The steering wheel according to claim 1 wherein said substance is held in a space and wherein walls that delimit said space have a structure which is designed such that it supports adhesion of said substance to said walls.

11. The steering wheel according to claim 1 wherein in said steering wheel electrodes are provided for generating one of said electrical and magnetic field.

12. The steering wheel according to claim 1 wherein a control unit is provided which can determine and intensity of one of said electrical and magnetic field.

13. The steering wheel according to claim 1 wherein sensors are provided which can detect vibrations of a column of said steering wheel, in particular of said steering wheel mounting, and wherein said control unit varies said field intensity as a function of said detected vibrations.

14. The steering wheel according to claim 1 wherein said field intensity is varied by said control unit such that no vibrations are imparted to said handling region.

15. A shock-absorbed vehicle steering wheel comprising: a hub with a steering wheel mounting and a steering wheel rim, a vibration damper being provided in a path of the flux of force between said steering wheel mounting and said rim in a manner to transfer radial and/or circumferential forces exerted to said rim to said steering wheel mounting, said vibration damper having damping characteristics which are adjustable via one of an electrical and magnetic field, and at least one of a hardness and viscosity of said substance being variably adjustable by one of said electrical and magnetic field.

* * * * *